J. M. MULHEIR.
STRAINER.
APPLICATION FILED MAR. 18, 1908.
948,185.
Patented Feb. 1, 1910.
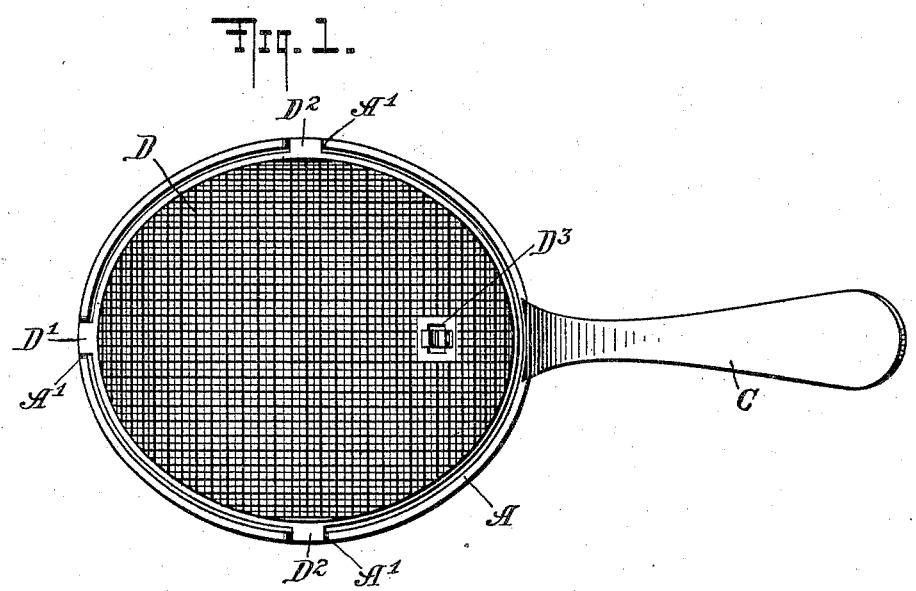
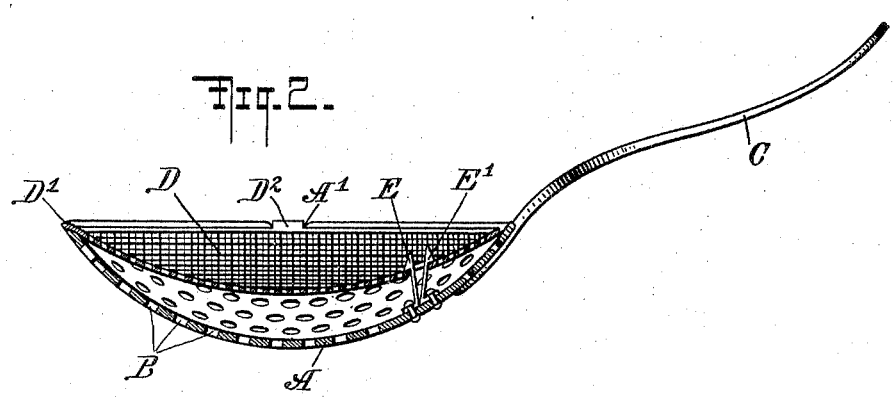
WITNESSES
INVENTORS
James M. Mulheir
BY
ATTORNEYS

UNITED STATES PATENT OFFICE.

JAMES M. MULHEIR, OF NEW YORK, N. Y.

STRAINER.

948,185.  Specification of Letters Patent.  Patented Feb. 1, 1910.

Application filed March 18, 1908. Serial No. 421,940.

*To all whom it may concern:*

Be it known that I, JAMES M. MULHEIR, a citizen of the United States, and resident of the borough of the Bronx, city, county, and State of New York, have invented certain new and useful Improvements in Strainers.

My invention relates to strainers such as are used in the preparation of mixed drinks and has for its object to improve the construction of such strainers so as to prevent the escape of any foreign matter from the mixing glass or other receptacle into the drinking glass.

My invention will be fully described hereinafter and the features of novelty will be pointed out in the appended claim.

Reference is to be had to the accompanying drawing in which—

Figure 1 is a plan view of my improved strainer and Fig. 2 is a central longitudinal sectional view thereof.

In the drawing A is the bowl of the strainer which is perforated as indicated at B and is provided with a handle C.

D is an auxiliary strainer composed of a wire cloth or similar material, the foraminations of which are much finer than the perforations of the bowl A. In other words, the main strainer is a coarse one while the auxiliary strainer is a much finer one. This auxiliary strainer D is provided with an end lip D' and two side lips D² which fit into corresponding recesses A' located in the periphery of the bowl A. Secured to the bowl is a spring catch comprising two resilient members E and E' normally tending to spring apart or spread. These catch members are arranged to project through an opening D³ in the auxiliary strainer D to secure it in position on the main strainer A.

My device is used in the customary way by holding the strainer over the mouth of the mixing receptacle after the drink has been mixed and pouring the contents therethrough into the drinking glass. The liquid first passes through the fine strainer D and is thoroughly strained and then percolates through the main strainer A into the drinking glass. No perceptible impurities which may exist in the liquid or the ice used in mixing, thus pass through to the drinking glass.

My invention is simple and easily used and as the parts are separable the two strainers are easily cleaned. By having the two strainers connected accidental separation is impossible and the danger of misplacing them is obviated; also the necessity of first using one strainer and then the other of finer mesh is done away with.

I claim:

A device for straining liquids, comprising a handled concave main strainer provided with perforations distributed over its entire surface, an auxiliary similarly concaved strainer located in said main strainer but spaced therefrom except at the edges which are coincident with the edges of said main strainer, said auxiliary strainer being further provided with perforations smaller than those of the main strainer and also distributed over its entire surface, and resilient means integrally attached to the main strainer for locking said strainers together.

In testimony whereof I have signed this specification in the presence of two subscribing witnesses.

JAMES M. MULHEIR.

Witnesses:
 JOHN A. KEHLENBECK,
 RUDOLPH ABERLI.